March 2, 1965  T. B. DALTON  3,171,672
KING-PIN LOCK STRUCTURE AND OPERATING MECHANISM
Filed March 11, 1963  8 Sheets-Sheet 1

INVENTOR.
THOMAS B. DALTON
BY
Barnes, Kisselle, Raisch & Choate
ATTORNEYS

INVENTOR.
THOMAS B. DALTON
BY
Barnes, Kisselle, Raisch & Choate
ATTORNEYS

March 2, 1965      T. B. DALTON      3,171,672
KING-PIN LOCK STRUCTURE AND OPERATING MECHANISM
Filed March 11, 1963      8 Sheets-Sheet 5

INVENTOR.
THOMAS B. DALTON
BY
Barnes, Kisselle, Raisch & Choate
ATTORNEYS March 2, 1965 T. B. DALTON 3,171,672
KING-PIN LOCK STRUCTURE AND OPERATING MECHANISM
Filed March 11, 1963 8 Sheets-Sheet 6

INVENTOR.
THOMAS B. DALTON
BY
Barnes, Kisselle, Raisch & Choate
ATTORNEYS

United States Patent Office 3,171,672
Patented Mar. 2, 1965

3,171,672
KING-PIN LOCK STRUCTURE AND OPERATING MECHANISM
Thomas B. Dalton, Muskegon, Mich., assignor to Westran Corporation, Muskegon, Mich., a corporation of Michigan
Filed Mar. 11, 1963, Ser. No. 264,141
27 Claims. (Cl. 280—437)

This invention relates generally to fifth wheels of the type used to interconnect highway tractor and semi-trailer combinations. More particularly, the invention involves a lock structure by which a king-pin on one fifth wheel plate is secured to the other fifth wheel plate. The invention also involves operating mechanism for the lock structure.

Conventional king-pin locking devices are subject to "false locking," a condition which results when a king-pin, to outward appearances, is properly homed in the king-pin throat but is, in fact, improperly positioned. The locking device closes, but does not properly engage the king-pin. During road use, the king-pin may escape from the king-pin throat permitting the semi-trailer to drop off of the tractor.

Fifth wheel locking devices have also been known to open accidentally with the same result. King-pins vary in length. Damaged or bent king-pins are sometimes improperly engaged by the locking structure. These features also contribute to faulty coupling between fifth wheel elements.

The object of the present invention is to provide a relatively simple, inexpensive fifth wheel lock structure which is improved to overcome the above disadvantages and in addition to provide an operating mechanism for the lock structure which is very simple of operation, having only one motion of an operating handle to open completely and one motion to close completely.

Generally, the invention contemplates the use of a stationary jaw and a swinging jaw, each having cylindrical surfaces which grip the king-pin throughout its length. The swinging jaw has a range of relatively free movement so that it can adjust to the individual characteristics of various king-pins which might be bent or damaged. When the swinging jaw is open, a finger projects into the king-pin home space to prevent a king-pin from homing and tripping the lock mechanism unless it is in the proper position relative to the jaws. The swinging jaw is locked in place by a sliding, wedge-shaped bolt. The stationary jaw is mounted for a certain amount of longitudinal movement, and this movement trips the lock-actuating mechanism when the king-pin homes properly.

A bolt-retracting lever arrangement is provided wherein a relatively high mechanical advantage is provided for breaking the wedge away from the swinging jaw, and then a lower mechanical advantage is provided to facilitate rapidly withdrawing the bolt to its completely retracted position. The pivot for the swinging jaw bears little or no load in closed position of the jaws so that the possibility of breakage is minimized. Moreover, the locking jaw structure is easily disassembled and reassembled by merely removing the pivot pin. In the drawings:

Figure 1:
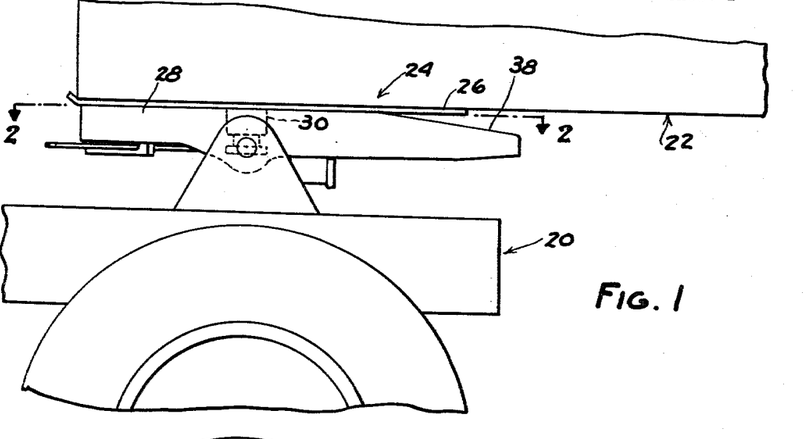
FIG. 1 is a fragmentary side elevational view of a tractor and semi-trailer combination utilizing a fifth wheel having components according to this invention.

Shown in FIG. 1 is a tractor 20 coupled to the forward end of a semi-trailer 22 through a fifth wheel unit 24 which includes an upper fifth wheel plate 26 on the semi-trailer and a lower fifth wheel plate 28 on the tractor. A king-pin 30 depending from upper plate 26 is locked to the lower plate by a lock structure 32 according to this invention which includes a forward jaw 34 and a rear jaw 36. Fifth wheel plate 28 has conventional downwardly and rearwardly sloping tail ramps 38 defining a forwardly tapering opening 40 which guides a king-pin into a longitudinal throat 42 for locking engagement by jaws 34, 36.

Figures 4, 5, 6:
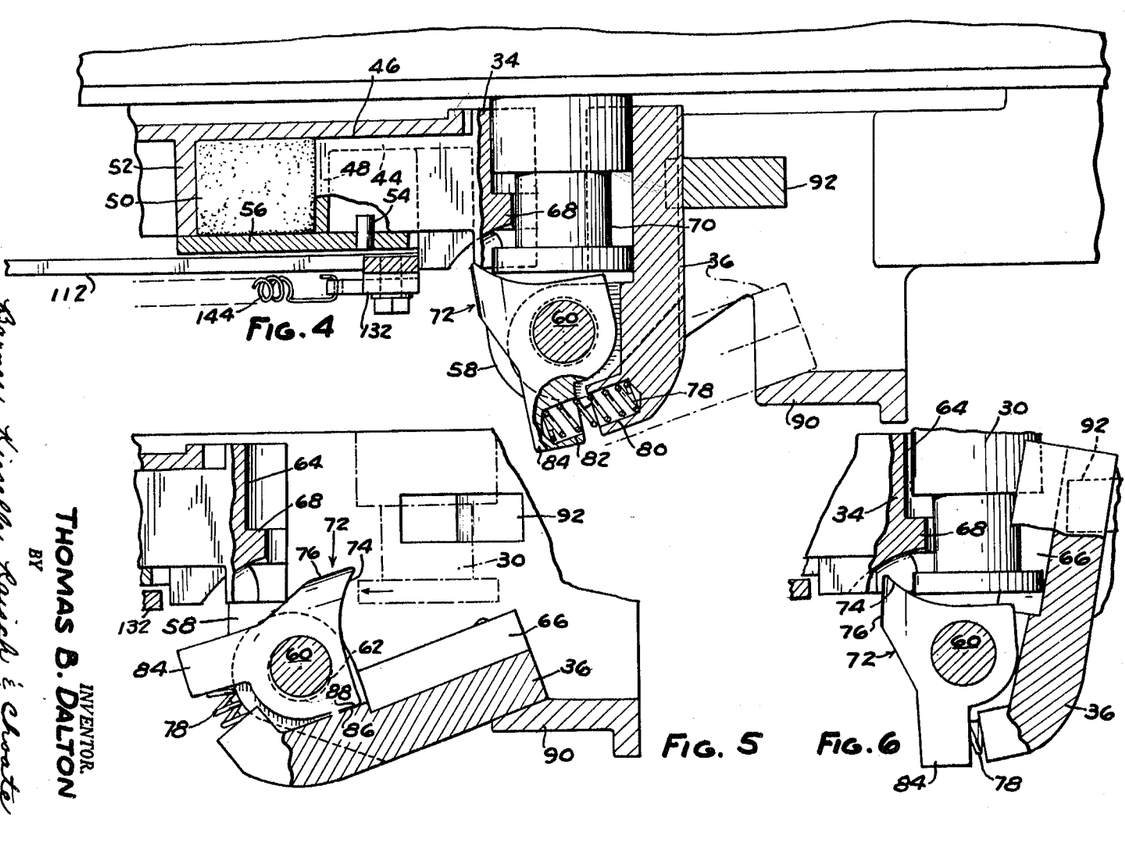
FIG. 4 is an enlarged sectional view on line 4—4 of FIG. 2 showing the king-pin jaws in closed relation.
FIG. 5 is a fragmentary view similar to FIG. 4 showing the jaws in open relation.
FIG. 6 is a fragmentary view similar to FIG. 4 showing the jaws in an intermediate condition.

Front jaw 34 has a forward extension 44 longitudinally slidable in a housing 46 positioned longitudinally forward of throat 42. Jaw extension 44 has a forward wall 48 engaged by a compressed spring 50 which reacts against a wall 52 formed by a part of the lower fifth wheel plate. In FIG. 4, the spring is illustrated as being a body of rubber. Jaw 44 is retained within housing 46 against the action of spring 50 when the locking mechanism is open by means of a stationary pin 54 projecting upwardly from the bottom 56 of the housing for engagement by jaw wall 48.

Rear jaw 36 is pivotally mounted on yokes 58 depending from fifth wheel 38 by means of a pivot pin 60 extending through aligned openings in the yoke and an opening 62 in jaw 36. Opening 62 has a diameter sufficiently greater than that of pin 60 to provide a clearance greater than normally provided in a pivotal joint to facilitate floating movement of jaw 36 for a purpose to be described. Jaws 34 and 36 have cylindrical surfaces 64 and 66 respectively of sufficient axial extent to engage and grip a king-pin substantially throughout its extent. Forward jaw 34 has an arcuate land 68 positioned for entry into the locking recess 70 of a king-pin.

An actuating finger 72 is pivotally mounted on pin 60 to swing with jaw 36. Finger 72 has a portion 74 disposed above pivot 60 in open position of jaw 36 and another upwardly disposed portion 76 disposed rearwardly of the axis of pivot 60. A compressed coil spring 78 seats in sockets 80 and 82 respectively in jaw 36 and an extension 84 on finger 72. Spring 78 biases the finger and jaw toward the FIG. 5 position wherein surface portions 86 and 88 are interengaged. Jaw 36 is supported in open position by a support 90 formed by a part of fifth wheel 28.

Figures 7, 8:
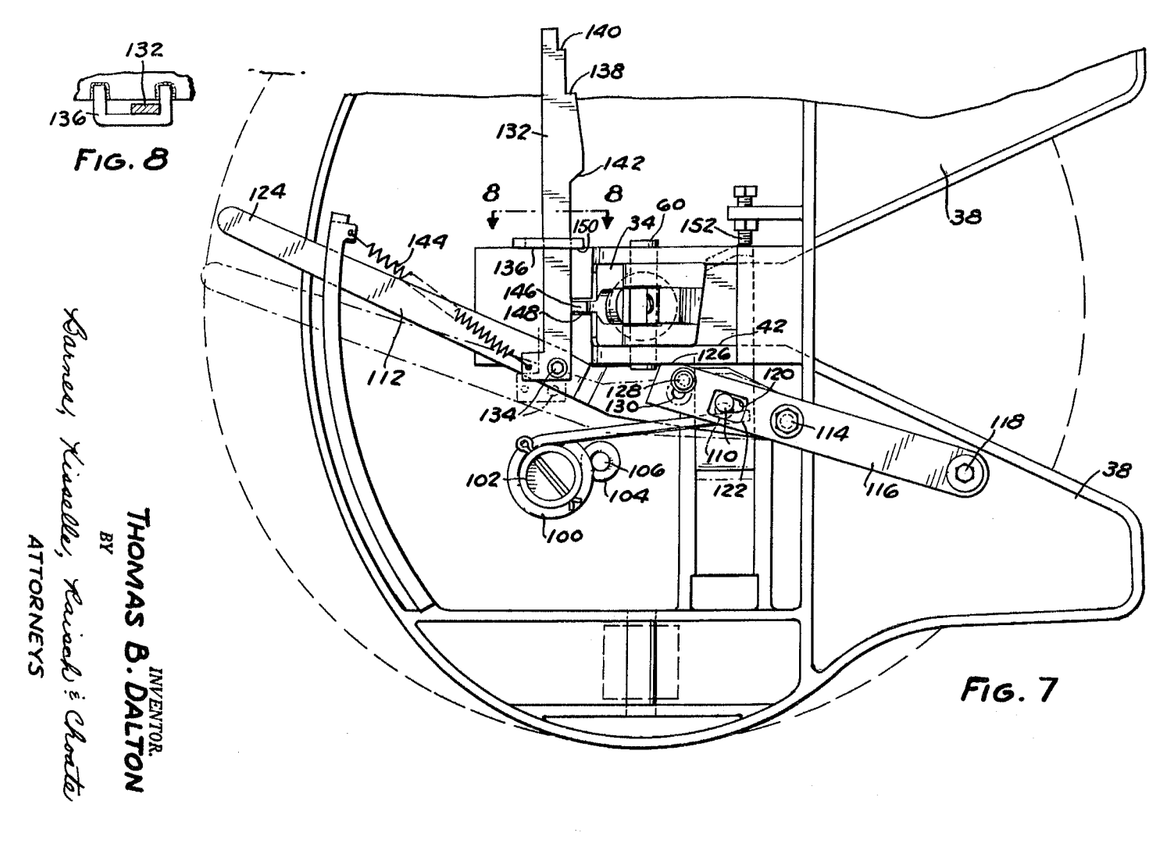
FIG. 7 is a bottom plan view of the fifth wheel showing the parts in closed condition.
FIG. 8 is a sectional view on line 8—8 of FIG. 7.

A locking bolt 92 for the jaw structure is slidably mounted in ways 94 on the fifth wheel and the bolt has a tapered surface 96 which, in the locked position of FIG. 7, engages a complementally tapered surface 98 on rear jaw 36. Bolt 92 is biased toward its locked position by a coil spring 100 engaged around a post 102 on the underside of the fifth wheel. The spring has one end 104 looped around an anchor stud 106 and its other end 108 engages a stud 110 on bolt 92.

The bolt is retracted against the action of spring 100 by means of a lever 112 having a pivotal connection 114 to an arm 116 in turn pivotally connected to fifth wheel 28 at 118. Stud 110 on bolt 92 projects through a slot 120 in lever 112. Arm 116 is provided with an opening 122 into which the lower end of stud 110 projects. With this arrangement, when the outer end 124 of lever 112 is pulled counterclockwise as FIG. 7 is viewed, pivot 114 provides the fulcrum for initial bolt-retracting movement of lever 112. Reaction to the bolt-retracting force is transmitted to the fifth wheel by abutment of the free end 126 of arm 116 against an element of the fifth wheel as shown in FIG. 7.

Lever 112 is provided with a stud 128 which projects upwardly through a slot 130 in arm 116. Slot 130 is arranged to accommodate arcuate movement of stud 128 about fulcrum 114. When stud 128 engages the counterclockwise extremity of slot 130, movement of lever 112 relative to arm 116 is obstructed. Upon further counterclockwise movement of lever 112, arm 116 moves with it so that the two cooperate to provide an extended lever whose fulcrum is pivot 118.

Figure 11:
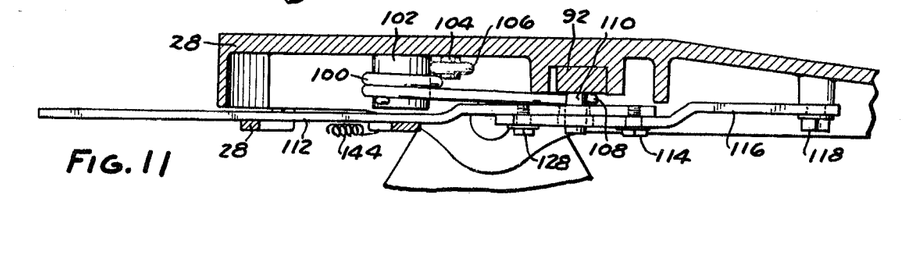
FIG. 11 is a sectional view on line 11—11 of FIG. 9.
Figure 12:
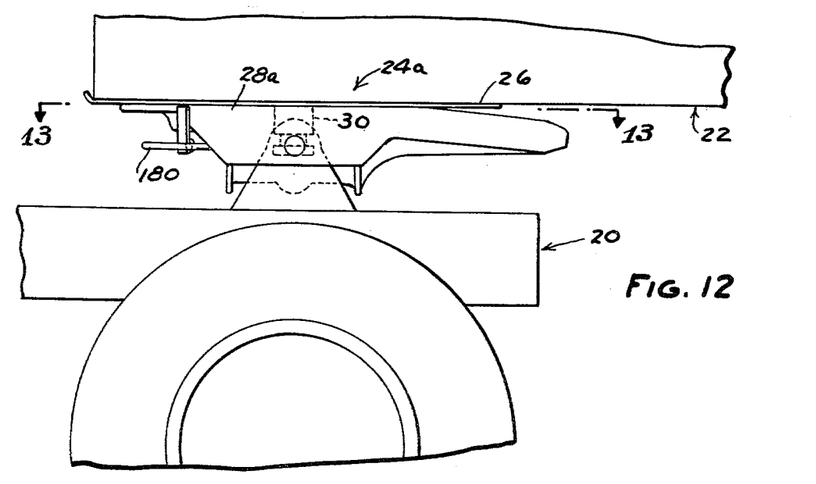
FIGS. 12 and 13 are respectively generally similar to FIGS. 1 and 2 but illustrate a modified form of the invention.
Figure 13:
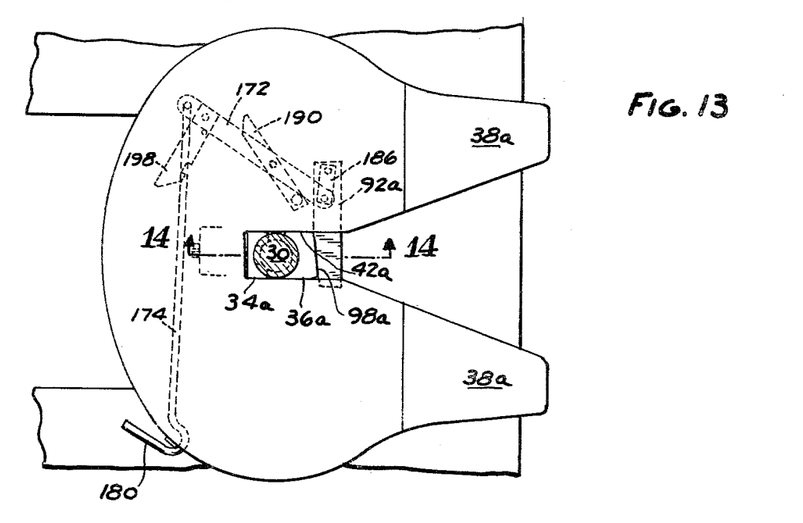
Figures 14, 15, 16, 17:
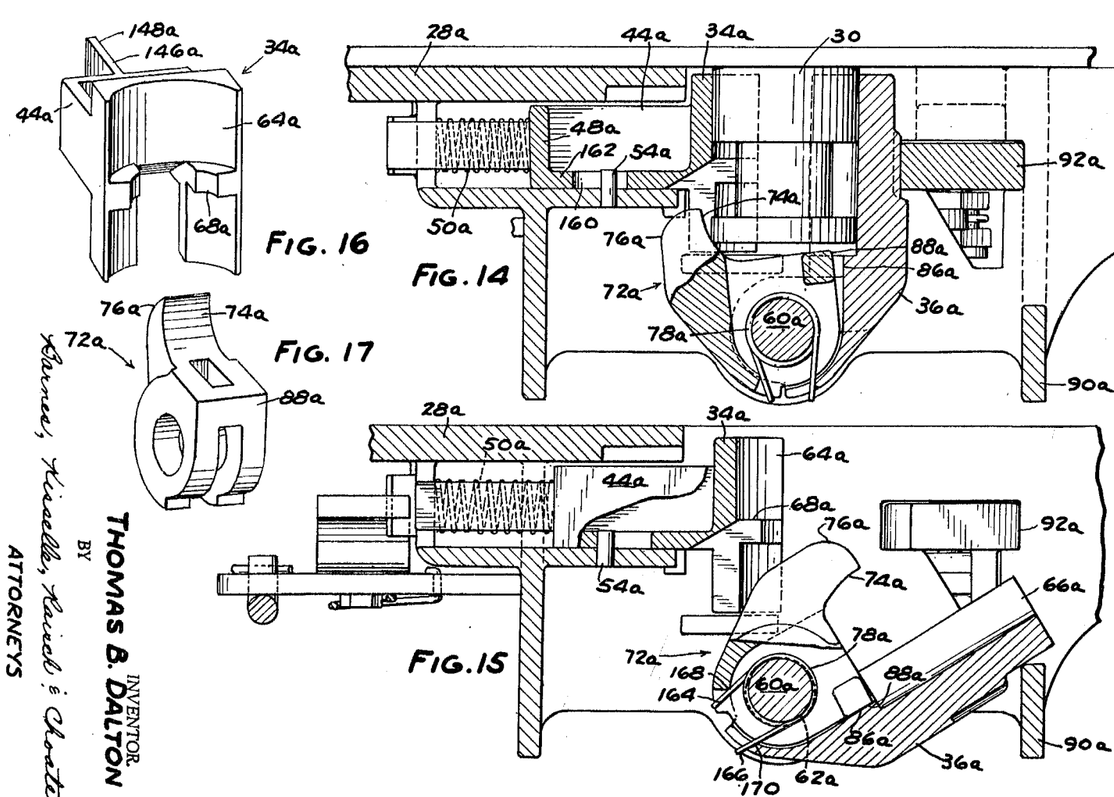
FIG. 14 is an enlarged generally sectional view on line 14—14 of FIG. 13.
FIG. 15 is a view generally similar to FIG. 14 but showing the parts in a different position.
FIG. 16 is a perspective view of the forward king-pin jaw in the modified form of the invention.
FIG. 17 is a perspective view of an actuating finger in the modified form of the invention.

A sear arm 132 is pivotally mounted on lever 112 as at 134 and extends slidably through a guide and retainer 136. Arm 132 has a side edge which is provided with sear notches 138 and 140 and an incline 142. The sear arm is biased clockwise as FIGS. 7 and 11 are viewed by a spring 144.

Forward jaw 34 is provided with a forward projection 146 forming a shoulder 148 for engagement by sear notch 138. Guide 136 also has a portion providing a shoulder 150 positioned for engagement by sear notch 140.

Figure 2:
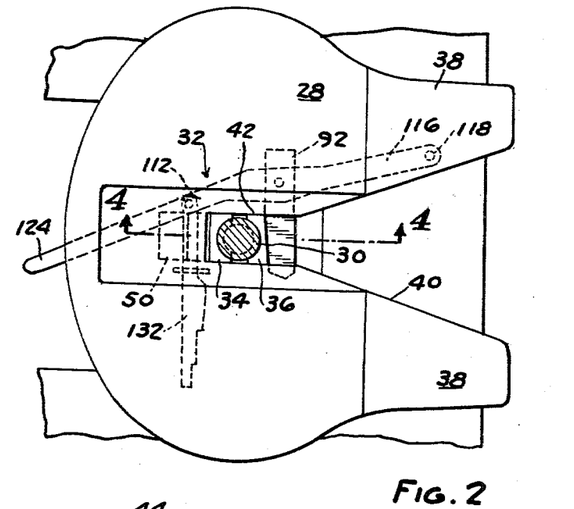
FIG. 2 is a sectional view on line 2—2 of FIG. 1.
Figure 3:
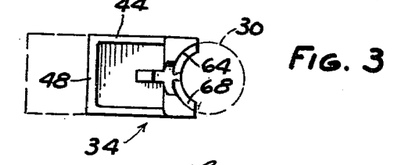
FIG. 3 is a bottom plan view of the forward king-pin jaw.

In use, it may be assumed that tractor 20 and semi-trailer 22 are coupled, jaws 34 and 36 being retained in locked engagement around king-pin 30 by bolt 92. The relation of the parts is shown in FIGS. 2, 4, and 7. To uncouple the tractor and trailer, operating handle 24 is first moved counterclockwise as FIG. 7 is viewed. Bolt 92 is broken loose from wedging engagement with taper surface 98 on jaw 36 by the initial movement of lever 112 from the solid-line position to the dotted-line position shown in FIG. 7. During this movement, the fulcrum for lever 112 is at pivot 114 which is relatively close to the load point on the bolt which is at pin 110. At this time, the lever has a mechanical advantage of about 8 to 1, as will be apparent from the drawing. Thus, it is relatively easy to break the bolt loose.

Upon further bolt-retracting movement of the lever, pin 128 engages the counterclockwise end of slot 130 in the manner described so that lever 112 and arm 116 cooperate to provide a single lever fulcrumed at 118 for completing retraction of the bolt. Fulcrum 118 is relatively distant from pin 110 and the mechanical advantage of the bolt-retracting lever is reduced to about 1½ to 1. Thus, once the bolt has been broken away from jaw 36, it can be rapidly withdrawn to its fully retracted position.

Figure 9:
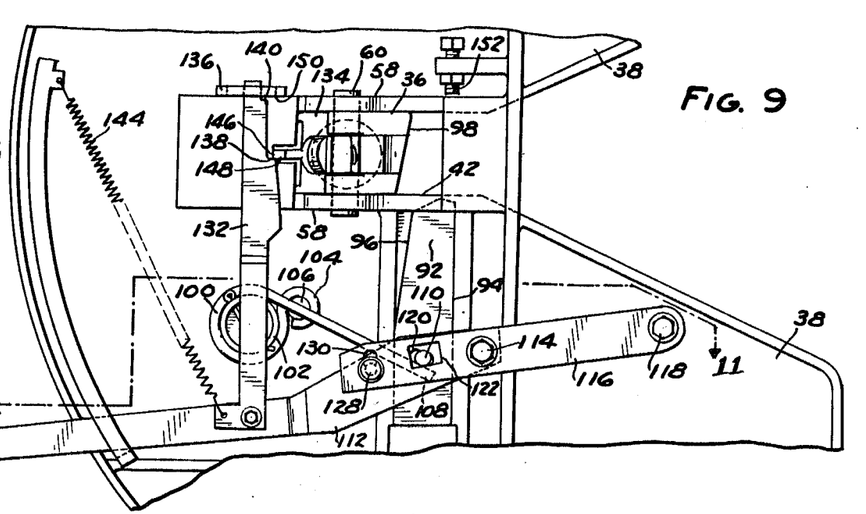
FIG. 9 is a fragmentary view similar to FIG. 7 but showing the bolt in retracted condition.

During retracting movement of lever 112, sear arm is pulled downwardly as FIGS. 7 and 9 are viewed by lever 112 through guide 136. Incline 142 swings the sear arm counterclockwise, and upon continued downward movement, sear notch 138 snaps into engagement with shoulder 148 on forward jaw 34 under the action of spring 144. This initially retains bolt 92 in its fully retracted position.

Jaw 36 is now freed for swinging downwardly out of throat 42 to the open position of FIG. 5 when king-pin 30 is withdrawn to uncouple the trailer from the tractor. When king-pin 30 moves longitudinally out of engagement with jaw 34, spring 50 forces extension 44 and jaw 34 rearwardly. This withdraws shoulder 148 from sear notch 138, whereupon spring 100 shifts the bolt-operating linkage clockwise to the position shown in FIG. 10 wherein sear notch 140 engages shoulder 150 on guide 136. This retains the bolt in its retracted position until a subsequent coupling operation.

In a coupling operation, tractor 20 is backed under semi-trailer 22 so that plate 26 rides up ramps 38 and king-pin 30 passes through tapered opening 40 into longitudinal throat 42 in the lower fifth wheel plate. If king-pin 30 is properly positioned within throat 42, its lower end will advance longitudinally against portion 74 of actuating finger 72 for jaw 36. Since this portion is disposed above pivot 60, continued longitudinal movement of the king-pin toward forward jaw 34 will cause finger 72 to swing counterclockwise as FIGS. 4–6 are viewed. This motion is transmitted through spring 78 to jaw 36 which swings upwardly into throat 42 behind the king-pin as illustrated in FIG. 6. In the final coupling movement, the king-pin engages jaw 34 forcing it longitudinally forwardly against the action of spring 50 which absorbs some of the coupling impact.

Figure 10:
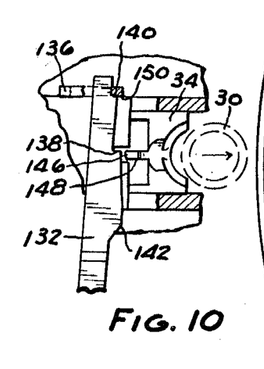
FIG. 10 is a fragmentary view similar to FIG. 9 but showing the relation of the parts when the king-pin is withdrawn.

When jaw 34 is forced forwardly, projection 146 thereon rocks sear lever 132 counterclockwise as FIGS. 7, 9, and 10 are viewed, thereby disengaging sear notch 140 from shoulder 150. Spring 100 then slides bolt 92 from the retracted position of FIG. 11 to the locked position of FIG. 7, thereby tightly clamping cylindrical surfaces 64 and 66 of the jaws around substantially the entire length of the king-pin. An adjustable stop 152 is provided in the path of bolt 92 to prevent it from advancing far enough to become wedgingly jammed between jaw 36 and ways 94. The stop may conveniently comprise a bolt and lock nut mounted on a portion of the fifth wheel as shown.

During terminal closing movement of jaw 36, coupling finger 72 is free to move independently of jaw 36. Also, jaw 36 is free to shift relative to pivot 60 as permitted by the clearance between the pivot and holes 62 in the jaw. Jaw 36 is thus free to adjust itself for effectively gripping king-pins having varying individual characteristics such as might be caused by differences in manufacture or damage or bending during the course of use.

If, as sometimes happens as a result of plate 26 riding up incline 38, the king-pin should happen to drop into throat 42 in a vertical direction rather than approaching finger 72 in a longitudinal direction, the king-pin will come to rest on the top surface 76 of the actuating finger. Since this portion of the finger is rearwardly of the axis of pin 60, the entire weight on the king-pin will tend to rock the finger clockwise as FIG. 5 is viewed and thereby obstruct closing movement of jaw 36. This makes false locking of the jaw structure impossible. For proper coupling, the king-pin must be withdrawn and then advanced longitudinally in throat 42 against finger 72 in the manner described.

When jaws 34 and 36 are lockingly engaged with a king-pin as in FIG. 4, pivot pin 60 bears little or no load. Pin 60 could actually be removed without disturbing locked engagement of the jaws against the king-pin.

Thus, the possibility of breakage of the pivot structure is minimized. Moreover, the jaw assembly can be completely disassembled by merely removing pin 60. This simplifies any maintenance and parts replacement procedures which might be required.

The entire structure is very simple to operate. To unlock the structure requires only pulling on handle 124 in a single continuous motion. Similarly, the structure engages and locks the king-pin by a single continuous motion of the parts from retracted to locked condition.

The modified form of the invention illustrated in FIGS. 13–22 is generally similar to the form described above; and in the drawings, certain analogous components are given similar reference characters except for the addition of an "a."

In the modified form, forward king-pin jaw 34a is biased rearwardly by coil springs 50a and retaining pin 54a cooperates with a slot 160 in a bottom wall 162 of forward jaw extension 44a to retain the forward jaw in place against the action of springs 50a when the jaw structure is open.

Control finger 72a and rearward jaw 36a are yieldably biased toward interengagement of their respective surfaces 88a and 86a by means of a torsion coil spring 78a encircling pivot 60a and having ends 164 and 166 engaging shoulders 168 and 170 on the finger and jaw respectively.

Locking bolt 92a is biased toward locked engagement with jaw 36a by coil torsion spring 100a whose end 108a engages stud 110a on the bolt. The bolt is retracted against the action of spring 100a by means of a lever 172 pivotally connected to a pull rod 174 as at 176 and passing slidably through a guide 178. The pull rod fits loosely within the guide to accommodate rocking movement incident to swinging of lever 172. The pull rod has a terminal handle 180. A compressed coil spring 181 around the pull rod biases it toward the locked position of FIG. 18.

Lever 172 has an edge portion 182 which bears laterally against a stud 184 depending from the fifth wheel, this stud providing the fulcrum for lever 172 in initial bolt-retracting movement. The lever is operably connected to bolt 92a by link plates 186 (FIGS. 19 and 21) which are pivoted onto stud 110a and are pivoted onto lever 172 at 188.

A two-piece arm 190 is pivotally connected to an intermediate portion of lever 172 as at 192. This arm is also pivotally connected to stud 184 and has a free end 194 which engages a stationary rib 196 on the fifth wheel after initial bolt-retracting movement of lever 172. Thereafter, pivot 192 provides the fulcrum for lever 172.

Figure 18:
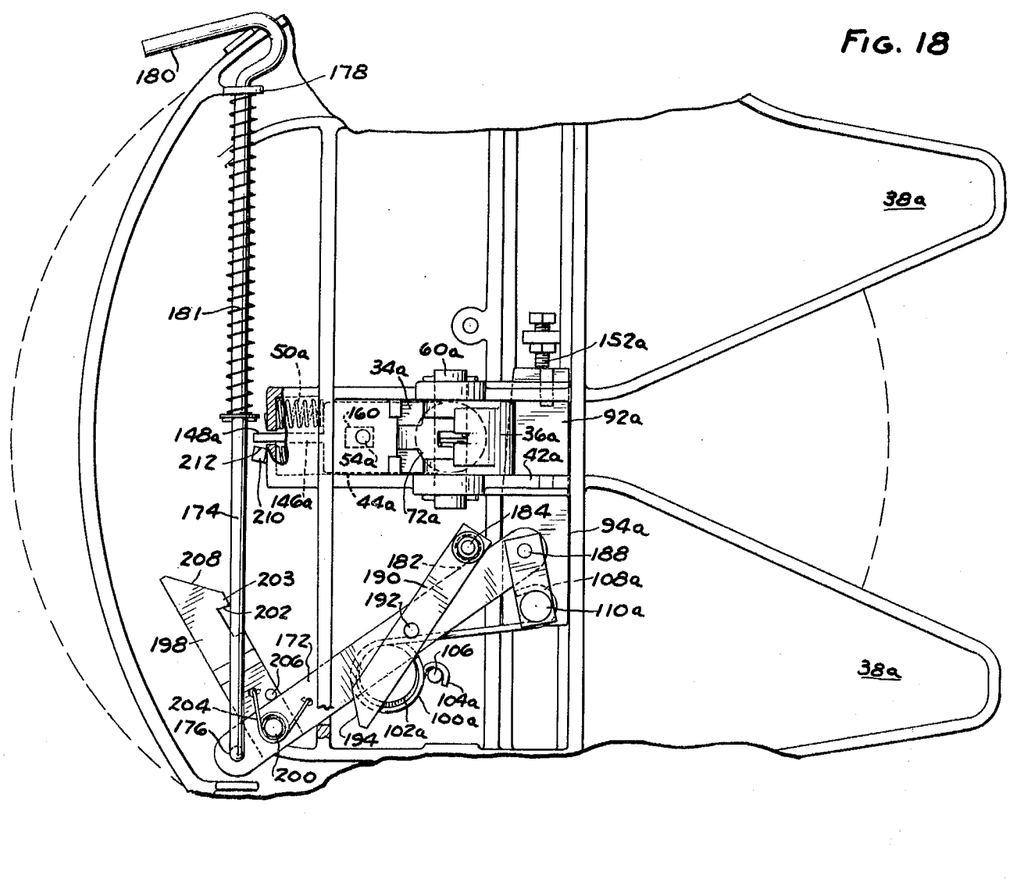
FIG. 18 is a bottom plan view of the fifth wheel showing the modified form of mechanism in closed condition.
Figures 19, 20, 21, 22:
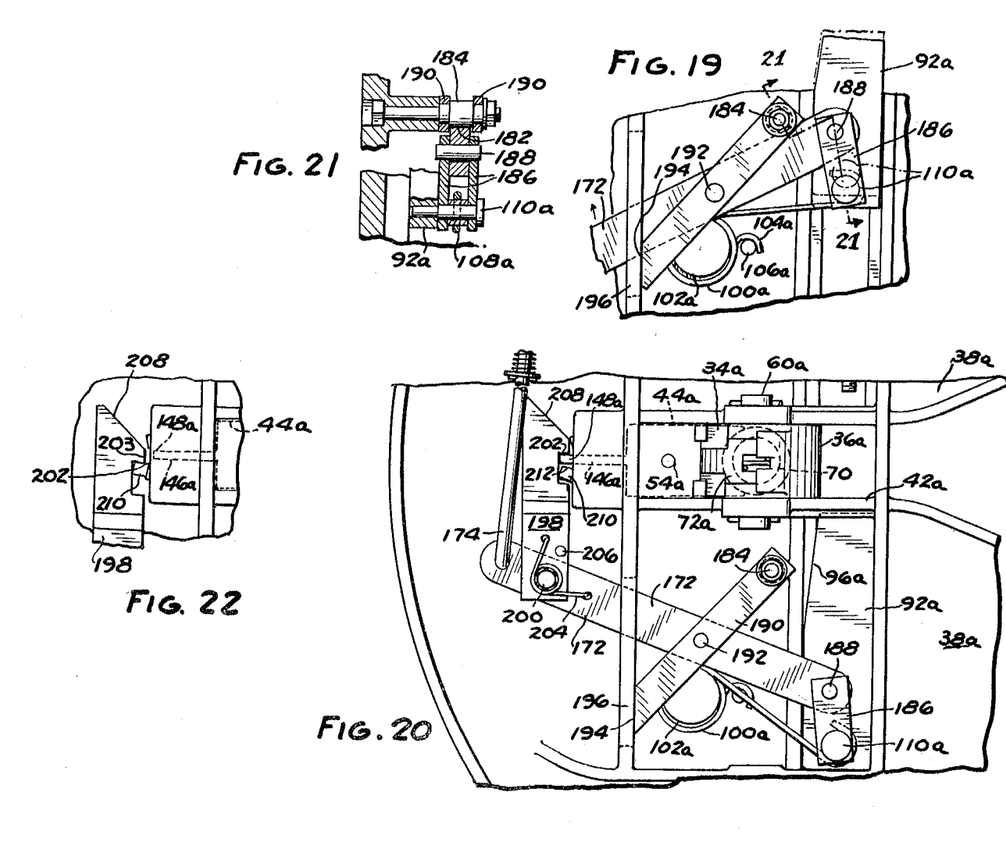
FIG. 19 is a fragmentary bottom plan view of the modified form of the invention illustrating initial bolt-retracting movement of the operating mechanism.
FIG. 20 is a fragmentary bottom plan view of the modified form of the invention showing the operating mechanism in retracted condition.
FIG. 21 is a sectional view on line 21—21 of FIG. 19.
FIG. 22 is a fragmentary bottom plan view illustrating certain of the parts in uncoupled condition of the fifth wheel in the modified form of the invention.

A sear arm 198 is pivotally connected to lever 172 at 200 and has a sear notch 202 and an adjacent edge portion 203. The sear arm is biased clockwise as FIGS. 18 and 20 are viewed by a torsion spring 204 and a stop 206 limits clockwise swinging of the sear arm at a proper location for engagement of an incline 208 on the sear arm with a stationary lug 210 on the fifth wheel and with forward projection 146a on forward jaw 34a. Lug 210 provides a shoulder 212 for engagement by sear notch 202.

Functioning of this form of the invention is in general similar to that described above. It may be assumed that tractor 20 and semi-trailer 22 are initially coupled, jaws 34a and 36a being retained in locked engagement around king-pin 30 by bolt 92a as in FIG. 14. To uncouple the tractor and trailer, pull rod 174 is first pulled outwardly or upwardly as FIGS. 18 and 20 are viewed, thereby swinging lever 172 clockwise from the FIG. 18 position. In the initial movement, lever 172 pivots about stud 184 and through links 186 breaks wedge 92a away from wedging engagement with rear jaw 36a. During this initial movement represented by the dotted- and solid-line positions of stud 110a in FIG. 19, lever 172 has a relatively high mechanical advantage because of the proximity of its fulcrum 184 to bolt 92a.

During initial bolt-retracting movement, arm 190 swings with lever 172 until its free end 194 engages abutment 196 as shown in FIG. 19. This arrests pivoting movement of arm 190 about stud 184 and transfers the fulcrum for lever 172 to pivot 192. This pivot is further away from bolt 92a than is stud 184 so that upon further bolt-retracting movement of lever 172, the bolt is moved rapidly to its fully retracted position (FIG. 20).

During terminal retracting movement of the mechanism, incline 208 on sear arm 198 engages lug 210, and the arm is swung counterclockwise against the action of spring 204 to position sear notch 202 for snapping into engagement with shoulder 148a as shown in FIG. 20. When king-pin 30 is withdrawn from jaw 34a, the jaw shifts rearwardly under the action of springs 50a, thereby withdrawing shoulder 148a from beneath sear notch 202. Thereupon, lever 172 and the sear arm shift counterclockwise as FIGS. 18 and 20 are viewed, and the sear notch engages shoulder 212 on lug 210 (FIG. 22). As is shown in the drawings, shoulder 212 and the sear notch are angled somewhat to insure locking interengagement thereof.

When the fifth wheel members are recoupled, finger 72a functions similarly to finger 72 in the form described above to either close the jaws around the king-pin or prevent them from doing so according to whether the king-pin enters throat 42a in the proper direction. The independent spring-biased rocking movement of finger 72a and jaw 36a together with clearance 62a between jaw 36a and pivot 60a facilitate shifting of jaw 36a to accommodate individual characteristics of various king-pins in the manner described above.

When the king-pin properly homes against forward jaw 34a, rearward projection 146a thereon pushes against sear arm surface 203 and disengages notch 202 from shoulder 212. Spring 100a then forces bolt 92a from its retracted position of FIG. 20 to its locked position of FIG. 18, the lever system swinging counterclockwise during this movement.

I claim:

1. In a fifth wheel for semi-trailers and the like having a longitudinal opening for receiving a king-pin on a complementary fifth wheel, improved king-pin lock structure and operating mechanism therefor comprising, a first jaw on said fifth wheel positioned to receive a king-pin entering said opening, a second jaw mounted on said fifth wheel for swinging between an open position displaced from said opening and a closed position within said opening wherein it cooperates with said first jaw to lockingly engage a king-pin, a finger mounted to swing with said second jaw and projecting into said opening for engagement by a king-pin when said second jaw is in said open position, said finger being movable responsive to force exerted thereon in a longitudinal direction by a king-pin moving longitudinally in said opening toward said first jaw, said finger being operable responsive to king-pin-induced movement thereof to swing said second jaw to said closed position, said finger being positioned for engagement by a king-pin entering said opening adjacent said first jaw in a direction transverse to said longitudinal direction, said finger responsive to engagement thereof by a king-pin in said lateral direction providing an obstruction to closing movement of said second jaw, whereby to prevent false locking of said jaws, and releasable lock means operable responsive to attainment of closed relation of said jaws to a king-pin to secure said jaws in said closed relation, said second jaw and finger being separate elements, spring means being interposed between said finger and jaw through which said finger swings said second jaw to closed relation, said spring means being yieldable to facilitate differential terminal closing movement of said finger and second jaw so that said second jaw locks effectively relative to king-pins of varying individual characteristics.

2. The combination defined in claim 1 wherein said first jaw is mounted for movement in said longitudinal direction responsive to force exerted thereon by a king-pin engaging longitudinally against it, said lock means including a bolt having one position in locked engagement with said second jaw and a retracted position, and bolt operating means operable to move said bolt between said positions, said operating means including means releasably securing said bolt in said retracted position, said first jaw having an operative connection with said bolt operating means through which said first jaw, responsive to king-pin-induced longitudinal movement thereof, releases said releasable means to facilitate movement of said bolt to said one position.

3. In a fifth wheel for semi-trailers and the like having a longitudinal opening for receiving a king-pin on a complementary fifth wheel, improved king-pin lock structure and operating mechanism therefor comprising, a first jaw on said fifth wheel positioned to receive a king-pin entering said opening, a second jaw pivotally mounted on said fifth wheel for swinging between an open position and a closed position relative to said first jaw, releasable locking means operative to secure said jaws in closed relation, said second jaw having generally cylindrical portions generally complemental to cylindrical surface portions of a king-pin, the pivotal mount for said second jaw including elements between which there is a clearance providing a range of generally free movement for said second jaw, whereby to facilitate effective locking thereof relative to king-pins of varying individual characteristics.

4. The combination defined in claim 1 wherein said finger and second jaw are provided with sockets, said spring means comprising coil spring means seated in said sockets.

5. The combination defined in claim 1 wherein said spring means comprises torsion spring means having ends, one of which engages said finger and the other of which engages said second jaw.

6. The combination defined in claim 1 wherein said finger and second jaw are separate pivotally mounted members, the pivotal mount for said second jaw having elements between which there is clearance greater than normal operating clearance in a pivot, said clearance providing a range of generally free movement for said second jaw, whereby to facilitate effective locking thereof relative to king-pins of varying individual characteristics.

7. The combination defined in claim 6 wherein the king-pin engaging portions of said second jaw lie generally on a cylindrical surface complemental to cylindrical surface portions of a king-pin.

8. In a fifth wheel for semi-trailers and the like having a longitudinal opening for receiving a king-pin on a complementary fifth wheel, improved king-pin lock structure and operating mechanism therefor comprising, a first jaw on said fifth wheel positioned to receive a king-pin entering said opening, a second jaw pivotally mounted on said fifth wheel for swinging between an open position displaced from said opening and a closed position within said opening wherein it cooperates with said first jaw to lockingly engage a king-pin, a finger pivotally mounted to swing with said second jaw and projecting into said opening for engagement by a king-pin when said second jaw is in said open position, said finger being disposed so that it swings in one direction responsive to king-pin exerted force thereon in a longitudinal direction toward said first jaw, said finger being operable responsive to king-pin induced swinging thereof to swing said second jaw to said closed position, the pivotal mount for said second jaw including elements between which there is a clearance providing a range of generally free movement for said second jaw, spring means being interposed between said finger and second jaw through which said finger swings said second jaw to closed position, said spring means being yieldable so that it and said clearance facilitate automatic position adjustment of said second jaw in terminal closing movement thereof for locking effectively relative to king-pins of varying individual characteristics, said finger in open position of said second jaw being positioned for engagement by a king-pin entering said opening adjacent said first jaw in a direction transverse to said longitudinal direction, and, under the influence of king-pin-exerted force in said transverse direction, tending to swing in a direction opposite to the direction induced by longitudinal force thereon on said king-pin, so that under said transverse force said finger provides an obstruction to closing movement of said second jaw, whereby to prevent false locking of said jaws, and releasable lock means operable responsive to attainment of closed relation of said jaws to a king-pin to secure said jaws in said closed position.

9. In a fifth wheel for semi-trailers and the like having a longitudinal opening for receiving a king-pin on a complementary fifth wheel, improved king-pin lock structure and operating mechanism therefor comprising, a first jaw on said fifth wheel mounted for movement responsive to force exerted thereon in a longitudinal direction by a king-pin moving longitudinally in said opening against said first jaw, a second jaw mounted on said fifth wheel for movement between an open position and a closed position relative to said first jaw, means operable responsive to longitudinal movement of a king-pin in said opening toward said first jaw to move said second jaw from said open position to said closed position thereof, a bolt releasably engageable with said second jaw for locking it in said closed position, operating means for said bolt including spring means urging said bolt toward locking engagement with said second jaw and linkage operable to retract said bolt from said second jaw against the action of said spring means, said operating means including means providing sear means engageable with a shoulder on said fifth wheel for securing said bolt in retracted position, said first jaw being operative responsive to king-pin-induced movement thereof to release said sear means from said shoulder to facilitate locking engagement of said bolt with said second jaw under the action of said spring means.

10. The combination defined in claim 9 wherein a second shoulder is movably mounted on said fifth wheel, said sear means being engageable with said second shoulder responsive to bolt-retracting movement of said linkage for securing said bolt in retracted position, said first jaw responsive to withdrawal of a king-pin therefrom being operable to move said second shoulder for disengaging it from said sear means, said sear means being engageable with the first-mentioned shoulder responsive to disengagement thereof by said second shoulder.

11. The combination defined in claim 10 wherein said sear means includes a swingably mounted sear arm spring biased toward engagement with said shoulders, said sear arm having first and second sear notches engageable respectively with the first- and second-mentioned shoulders.

12. The combination defined in claim 10 wherein said sear means includes a swingably mounted sear arm having a sear notch, said arm being spring biased toward engagement of said notch with said second shoulder, said shoulders being closely adjacent when said first jaw is in engaged relation with a king-pin, said notch being engageable with the first-mentioned shoulder responsive to disengagement thereby of said second shoulder.

13. The combination defined in claim 10 wherein said second shoulder is carried by said first jaw.

14. The combination defined in claim 9 wherein said sear means includes a notched sear arm carried by said linkage and spring biased toward engagement with said shoulder.

15. The combination defined in claim 10 wherein said king-pin-induced movement of said first jaw is resisted by spring means which move said jaw responsive to withdrawal of a king-pin therefrom, the latter movement of said first jaw being effective to release said sear means from the first-mentioned shoulder.

16. In a fifth wheel for semi-trailers and the like having an opening for receiving a king-pin on a complementary fifth wheel, improved lock structure and operating mechanism therefor comprising, a first jaw on said fifth wheel positioned to receive a king-pin entering said opening, a second jaw mounted on said fifth wheel for movement between an open position and a closed position relative to said first jaw, a bolt having a tapered surface wedgingly engageable with said second jaw for locking it in closed position, operating means for said bolt including spring means urging said bolt toward locking engagement with said second jaw and a lever operably connected with said bolt for retracting it from said second jaw against the action of said spring means, a first fulcrum relatively close to said bolt relative to which said lever swings in initial bolt-retracting movement for disengaging said tapered surface from said second jaw, means providing a stop operative to obstruct swinging of said lever relative to said first fulcrum at the end of said initial movement, a second fulcrum for said lever relatively distant from said bolt, and means including said stop operable responsive to obstruction of said initial movement to establish said second fulcrum as the fulcrum for further bolt-retracting movement of said lever.

17. The combination defined in claim 16 wherein said means including said stop includes an arm having a pivotal connection to said fifth wheel, said lever having a pivotal connection to said arm, one of said pivotal connections providing said first fulcrum and the other providing said second fulcrum.

18. The combination defined in claim 17 wherein the pivotal connection between said lever and arm provides said first fulcrum, said arm having a portion which abuts against a part of said fifth wheel to provide support for the reaction to said initial bolt-retracting movement, said stop obstructing swinging movement of said lever relative to said arm and providing a connection between said lever and arm so that they cooperate to form an extended lever swingable relative to said second fulcrum.

19. The combination defined in claim 18 wherein said lever is connected to said bolt at a location between said first fulcrum and stop.

20. The combination defined in claim 17 wherein said pivotal connection between said arm and fifth wheel provides said first fulcrum, said arm being swingable with said lever in said initial bolt-retracting movement, said arm being engageable against a part of said fifth wheel to provide said stop, said pivotal connection between said lever and arm providing said second fulcrum, said stop providing support for the reaction to further bolt-retracting movement.

21. The combination defined in claim 20 wherein said lever has an edge which engages the pivot for said arm to provide said first fulcrum.

22. The combination defined in claim 21 wherein said lever is connected to said bolt through a link pivoted to said bolt and lever.

23. The combination defined in claim 16 wherein said lever has an edge portion which engages a substantially stationary part on said fifth wheel to provide said first fulcrum, an arm being pivotally connected to said fifth wheel and to said lever, said arm being swingable with said lever in said initial bolt-retracting movement, said arm having a portion which abuts against a part of said fifth wheel to provide said stop, the pivotal connection between said arm and lever providing said second fulcrum.

24. In a fifth wheel for semi-trailers and the like having a longitudinal opening for receiving a king-pin on a complementary fifth wheel, improved lock structure and operating mechanism therefor comprising, a first jaw on said fifth wheel mounted for longitudinal movement responsive to force exerted thereon in a longitudinal direction by a king-pin moving longitudinally in said opening against said first jaw, a second jaw mounted on said fifth wheel for movement between on open position and a closed position relative to said first jaw, the mount for said second jaw including elements between which there is a clearance facilitating longitudinal movement of said second jaw so that said second jaw can adjust to king-pins of varying individual characteristics, a bolt slidably mounted on said fifth wheel for movement transverse to said longitudinal direction, said bolt having a tapered surface wedgingly engageable with said second jaw for locking it in closed position, operating means for said bolt including spring means urging said bolt toward locking engagement with said second jaw and a lever operably connected with said bolt for retracting it from said second jaw against the action of said spring means, a first fulcrum relative to which said lever swings in initial bolt-retracting movement for disengaging said tapered surface from said second jaw, said first fulcrum being positioned to provide said lever with relatively high mechanical advantage in said initial bolt-retracting movement, a second fulcrum relative to which said lever swings in bolt-retracting movement beyond said initial movement, said second fulcrum being positioned to provide said lever with a relatively low mechanical advantage in bolt-retracting movement beyond said initial movement, and means operable responsive to completion by said lever of said initial bolt-retracting movement to establish said second fulcrum as the fulcrum for said bolt-retracting movement beyond said initial movement.

25. The combination defined in claim 24 wherein a stop is provided in the path of locking movement of said bolt, said stop being mounted for adjustable movement toward and away from said bolt to adjust the maximum amount of advance of said bolt in locking movement thereof.

26. In a fifth wheel for semi-trailers and the like having an opening for receiving a king-pin on a complementary fifth wheel, improved lock structure and operating mechanism therefor comprising, a first jaw on said fifth wheel positioned to receive a king-pin entering said opening, a second jaw mounted on said fifth wheel for movement between an open position and a closed position relative to said first jaw, a bolt having a tapered surface wedgingly engageable with said second jaw for locking it in closed position, operating means for said bolt including spring means urging said bolt toward locking engagement with said second jaw and a lever operably connected with said bolt for retracting it from said second jaw against the action of said spring means, a first fulcrum relative to which said lever swings in initial bolt-retracting movement for disengaging said tapered surface from said second jaw, said first fulcrum being positioned to provide said lever with a relatively high mechanical advantage in said initial bolt-retracting movement, a second fulcrum relative to which said lever swings in further bolt-retracting movement, said second fulcrum being positioned to provide said lever with a relatively low mechanical advantage in said further bolt-retracting movement, and means operable responsive to completion by said lever of said initial bolt-retracting movement to establish said second fulcrum as the fulcrum for said further bolt-retracting movement of said lever.

27. The combination defined in claim 26 wherein said first jaw is mounted for movement responsive to force exerted thereon in a longitudinal direction by a king-pin moving longitudinal in said opening against said first jaw, releasable means being mounted on said fifth wheel for retaining said lever in a position wherein said bolt is retracted, said first jaw being operative responsive to king-pin-induced movement thereof to release said releasable means to facilitate locking movement of said bolt under the action of said spring means.

References Cited by the Examiner
UNITED STATES PATENTS

| | | | |
|---|---|---|---|
| 2,431,779 | 12/47 | Stevens | 280—437 |
| 2,610,862 | 9/52 | Braunberger | 280—437 |
| 2,756,074 | 7/56 | Kayler | 280—437 |
| 2,833,560 | 5/58 | Cochrane | 280—437 |

A. HARRY LEVY, *Primary Examiner.*

LEO FRIAGLIA, *Examiner.*